US012797661B2

(12) United States Patent
Meyer et al.

(10) Patent No.: US 12,797,661 B2
(45) Date of Patent: Nov. 17, 2026

(54) STORAGE OCCUPANCY SPRINKLER SYSTEM

(71) Applicant: Victaulic Company, Easton, PA (US)

(72) Inventors: Stephen J. Meyer, Chester Springs, PA (US); John Desrosier, Plymouth, MA (US); Kevin Desmond Maughan, North Kingstown, RI (US)

(73) Assignee: VICTAULIC COMPANY, Easton, PA (US)

( * ) Notice: Subject to any disclaimer, the term of this patent is extended or adjusted under 35 U.S.C. 154(b) by 532 days.

(21) Appl. No.: 17/945,308

(22) Filed: Sep. 15, 2022

(65) Prior Publication Data

US 2023/0081459 A1 Mar. 16, 2023

Related U.S. Application Data

(60) Provisional application No. 63/244,307, filed on Sep. 15, 2021, provisional application No. 63/244,514, filed on Sep. 15, 2021.

(51) Int. Cl.
*A62C 35/68* (2006.01)
*A62C 35/64* (2006.01)

(52) U.S. Cl.
CPC .............. *A62C 35/68* (2013.01); *A62C 35/64* (2013.01)

(58) Field of Classification Search
CPC ......... A62C 35/68; A62C 35/64; A62C 3/002; A62C 35/58; A62C 35/60; A62C 35/62
USPC ........................................................... 169/56
See application file for complete search history.

(56) References Cited

U.S. PATENT DOCUMENTS

| | | | | |
|---|---|---|---|---|
| 5,829,532 | A | 11/1998 | Meyer et al. | |
| 6,221,263 | B1 | 4/2001 | Pope et al. | |
| 6,585,054 | B1 | 7/2003 | Thomas et al. | |
| 7,237,568 | B2 | 7/2007 | Cooper | |
| 7,383,892 | B2 | 6/2008 | Jackson | |
| 7,798,239 | B2 | 9/2010 | Golinveaux et al. | |
| 8,573,315 | B1 * | 11/2013 | Taylor .................... | A62C 35/68 169/13 |
| 9,381,386 | B2 | 7/2016 | Pigeon | |
| 9,474,920 | B1 | 10/2016 | Fewel et al. | |
| 10,272,274 | B2 | 4/2019 | Multer et al. | |

(Continued)

FOREIGN PATENT DOCUMENTS

| | | |
|---|---|---|
| JP | H07116281 A | 5/1995 |
| WO | 2020223603 A1 | 11/2020 |

OTHER PUBLICATIONS

Int'l Preliminary Report on Patentability issued Mar. 28, 2024 in Int'l Application No. PCT/US2022/043594.

(Continued)

*Primary Examiner* — Arthur O. Hall
*Assistant Examiner* — Anna Thi Ho
(74) *Attorney, Agent, or Firm* — Panitch Schwarze Belisario & Nadel LLP

(57) ABSTRACT

A storage occupancy sprinkler system is provided, which includes a fluid supply system, at least one cross-main pipe fluidly connected with the fluid supply system, a plurality of branchlines extending from, and are fluidly connected with, the at least one cross-main pipe, and a plurality of storage sprinkler heads projecting from, and fluidly connected with, the plurality of branchlines. The storage sprinkler heads have a k-factor of at least 11.2 and a sprinkler rating greater than 175 psi.

15 Claims, 6 Drawing Sheets

(56) References Cited

U.S. PATENT DOCUMENTS

| | | | | |
|---|---|---|---|---|
| 10,780,303 | B2 | 9/2020 | Workman et al. | |
| 11,511,145 | B1 | 11/2022 | Sekula | |
| 2002/0003042 | A1 | 1/2002 | Reilly | |
| 2006/0097069 | A1 * | 5/2006 | Sundholm | A62C 35/58 239/127 |
| 2006/0243459 | A1 * | 11/2006 | Jackson | A62C 3/004 169/56 |
| 2007/0007018 | A1 | 1/2007 | Kong | |
| 2010/0065287 | A1 | 3/2010 | Burkhart et al. | |
| 2010/0155087 | A1 | 6/2010 | Golinveaux et al. | |
| 2010/0263884 | A1 * | 10/2010 | Perkovich | F16L 17/04 285/412 |
| 2012/0267125 | A1 * | 10/2012 | Abels | A62C 37/08 169/41 |
| 2013/0333903 | A1 | 12/2013 | Pounder et al. | |
| 2015/0034340 | A1 * | 2/2015 | Ronpagel | A62C 35/68 169/16 |
| 2016/0023029 | A1 | 1/2016 | Almeida et al. | |
| 2016/0030785 | A1 | 2/2016 | Ringer et al. | |
| 2016/0030786 | A1 | 2/2016 | Kochelek et al. | |
| 2016/0206905 | A1 * | 7/2016 | Burgess | A62C 35/68 |
| 2017/0120090 | A1 | 5/2017 | Magnone et al. | |
| 2017/0216641 | A1 | 8/2017 | Magnone et al. | |
| 2018/0056102 | A1 * | 3/2018 | Bodemann | A62C 35/60 |
| 2019/0099630 | A1 | 4/2019 | Pigeon | |
| 2019/0143162 | A1 | 5/2019 | Silva, Jr. | |
| 2019/0247692 | A1 | 8/2019 | Silva, Jr. et al. | |
| 2019/0308047 | A1 * | 10/2019 | Hofmann | F16L 21/002 |
| 2019/0366138 | A1 | 12/2019 | Mull | |
| 2020/0293706 | A1 * | 9/2020 | Vergil | G05D 7/0676 |
| 2020/0298036 | A1 | 9/2020 | Partridge et al. | |
| 2020/0324155 | A1 | 10/2020 | Franson | |
| 2021/0031063 | A1 | 2/2021 | van der Stokker | |
| 2022/0305314 | A1 * | 9/2022 | Troutt | A62C 37/40 |
| 2022/0379150 | A1 * | 12/2022 | Dibble | A62C 37/12 |
| 2023/0234080 | A1 | 7/2023 | Dibble | |
| 2023/0398389 | A1 | 12/2023 | Feenstra et al. | |

OTHER PUBLICATIONS

Int'l Search Report and Written Opinion issued Jan. 6, 2023 in Int'l Application No. PCT/US22/43594.
Office Action issued Oct. 16, 2024 in U.S. Appl. No. 18/798,162.
Office Action issued Feb. 24, 2025 in U.S. Appl. No. 18/798,162.
National Fire Protection Association, "National Fire Protection Association Report", Aug. 5, 2016 (Year: 2016).
Partial Search Report issued Jun. 26, 2025 in EP Application No. 22870663.6.
Office Action issued Jun. 24, 2025 in U.S. Appl. No. 18/798,162.

* cited by examiner

STORAGE OCCUPANCY SPRINKLER SYSTEM

CROSS-REFERENCE TO RELATED APPLICATIONS

This application claims priority from similarly-titled U.S. Provisional Patent Application No. 63/244,307, filed Sep. 15, 2021, and similarly-titled U.S. Provisional Patent Application No. 63/244,514, filed Sep. 15, 2021, the entire contents of each of which are incorporated by reference herein.

BACKGROUND OF THE DISCLOSURE

The disclosure generally relates to sprinkler systems, and, more particularly, to storage occupancy sprinkler systems.

A storage occupancy sprinkler system generally includes a water supply, e.g., a city/municipal supply or a reservoir tank and pump supply connected (via piping, e.g., underground) to a main riser conduit generally vertically extending upwardly to an elevation proximate the occupancy ceiling. Generally, in a grid, tree or loop system, the main riser conduit is connected to at least one laterally extending cross-main conduit, e.g., without limitation, a near cross-main, a far cross-main, and/or a looped-main, extending generally parallel to the underlying ground surface. Branchlines laterally extend from the cross-main conduit(s) (also generally parallel to the underlying ground surface) with storage sprinkler heads projecting from the branchlines.

Storage sprinkler heads are generally defined to be those sprinkler heads which are listed and approved by nationally recognized testing agencies and approval bodies such as UL Solutions and FM Approvals for protecting storage occupancies, including occupancies having storage occupancies therein. Such sprinkler heads generally have a k-factor of at least 11.2 and commonly include Early Suppression Fast Response ("ESFR") sprinkler heads, Control Mode Specific Application ("CMSA") sprinkler heads, Control Mode Density Area ("CMDA") sprinkler heads, among others. Various nationally recognized standards bodies such as the National Fire Protection Association ("NFPA") create standards for the use and installation of storage sprinklers, which are often incorporated into state, local, and regional building codes, and which are applied by local Authorities Having Jurisdiction ("AHJ"), for storage occupancy sprinkler systems. Additionally, certain bodies, such as FM Approvals, promulgate standards for the installation of storage sprinklers in storage occupancies in order to be approved to obtain commercial insurance for those occupancies. These standards act to require the use of listed storage sprinklers in storage occupancies. These standards may differentiate storage sprinklers by the sprinkler to sprinkler spacing at which they may be installed, with sprinklers known as standard coverage sprinklers generally being installed at up to approximately ten (10) feet apart, and extended coverage sprinklers, which may generally be installed at up to approximately fourteen (14) feet apart.

Storage occupancies commonly have ceiling heights of approximately 15 ft or higher and typically employ Early Suppression Fast Response ("ESFR") sprinkler heads. As previously described, however, other forms of storage sprinkler heads, including those identified above, may be suitable for use depending on the jurisdiction, the commodity, the ceiling height, and other factors appreciated by those of ordinary skill in the art. Storage of commodities is generally permitted to be piled up to approximately 3 ft below the sprinkler heads.

One of the aforementioned characteristics of storage sprinkler heads is the k-factor. As used herein, the k-factor is defined as a constant representing the sprinkler head discharge coefficient that is quantified by the flow of fluid in gallons per minute (GPM) from the sprinkler head outlet divided by the square root of the pressure of the flow of fluid fed into the inlet of the sprinkler head orifice in pounds per square inch (PSI). The k-factor is expressed as GPM/√PSI and the metric equivalents thereof. Industry accepted standards, such as, for example, the NFPA standard entitled "NFPA 13: Standards for the Installation of Sprinkler Systems" ("NFPA 13") (2010 ed.) and its updated edition NFPA 13 (2019 ed.), provide a rated or nominal k-factor or rated discharge coefficient of a sprinkler head as a mean value over a k-factor range. For example, for a k-factor greater than 11.2, NFPA 13 provides the following nominal k-factors in GPM/√PSI (with the k-factor range shown in parenthesis): (i) 11.2 (10.7-11.7); (ii) 14.0 (13.5-14.5); (iii) 16.8 (16.0-17.6); (iv) 19.6 (18.6-20.6); (v) 22.4 (21.3-23.5); (vi) 25.2 (23.9-26.5); (vii) 28.0 (26.6-29.4); (viii) 33.6 (31.9-35.3); (ix) 36.4 (34.6-38.2) or higher.

As should be understood, the pressure at which a sprinkler is fire tested, i.e., the sprinkler design pressure, dictates the minimum operating pressure that a respective sprinkler head should encounter during use in the sprinkler system and sets the basis the hydraulic demand calculations for the storage sprinkler system. That is, the total of the sprinkler design pressures of the hydraulically most remote group of sprinklers heads in the sprinkler system, as well as the total of the respective flow rates for those sprinkler heads, defines the sprinkler system demand, i.e., the required flow rate and flowing pressure to ensure that the hydraulically most remote design area of the sprinkler system is supplied with the proper amount of flow and pressure. Thus, sprinkler system demand is generally calculated by considering the pressure required for each of the sprinkler heads in the hydraulically most remote area of the system and then adding the various pressure losses back to the supply. For example, pressure losses within the system resulting from sprinkler head elevation, valving within the system, and friction within the piping network are accounted for. Friction losses within the piping network are significant, and, for straight segments of piping, are highly dependent on pipe inside diameter, with smaller pipe inside diameters having greater friction loss than pipe with larger inside diameters.

These criteria are calculated to ensure that the water supply provides the proper amount of flow and pressure to the most hydraulically demanding area of the system. In a reservoir tank supply system, a main pump is required to provide the necessary supply pressure and flow rate to achieve at least the sprinkler system demand. In a city/municipal supply system, a main pump is generally required to supplement the city pressure to provide the necessary supply pressure and flow rate to achieve the sprinkler system demand.

Ensuring proper flow and pressure to the most hydraulically demanding area of the system, subjects areas of the system in less hydraulically demanding locations to higher system pressures. Known storage sprinkler heads having a k-factor of at least 11.2 have a sprinkler rating of 175 psi. That is, the highest system pressure, flowing or static, that any sprinkler head in the sprinkler system is permitted to encounter under normal working conditions is 175 psi. The other components of the sprinkler system, e.g., the piping network, are typically rated higher than 175 psi. Accordingly, the sprinkler heads are the lowest pressure-rated component of a storage occupancy sprinkler system, and, therefore, limit the options available when selecting other components of the storage occupancy sprinkler system to ensure that the appropriate sprinkler system demand is achieved while also avoiding exceeding the 175-psi sprinkler rating.

For example, the hydraulic demand calculations may impose a minimum inside diameter limitation on the piping, e.g., the inside diameter of the branchlines, if use of an inside diameter smaller than that minimum would result in the maximum system pressure exceeding the sprinkler heads' rated pressure. Practically, storage occupancy sprinkler system designers are limited to selecting piping for use in the risers and branchlines from a set of standardized sizes and inside diameters of such piping (custom sizes being impractical). Thus, where the determined minimum inside diameter limitation does not correspond to an available standardized inside diameter of such piping, the designer is obligated to select at least the next largest standard size of piping. Larger inside diameter piping is generally more costly than smaller inside diameter piping. Therefore, one drawback of the 175-psi sprinkler rating is that a storage occupancy sprinkler system designer is often limited to utilizing more expensive components, such as branchline and riser piping, whereas an overall more cost-effective storage occupancy sprinkler system might be employed absent the sprinkler maximum pressure rating of 175 psi.

It would, therefore, be advantageous to utilize storage sprinkler heads having a k-factor of at least 11.2 and a sprinkler rating of greater than 175 psi to provide a designer with greater flexibility to design a more cost-effective storage occupancy sprinkler system.

BRIEF SUMMARY OF THE DISCLOSURE

Briefly stated, one aspect of the present disclosure is directed to storage occupancy sprinkler system having a fluid supply system, at least one cross-main pipe fluidly connected with the fluid supply system, a plurality of branchlines extending from, and fluidly connected with, the at least one cross-main pipe, and a plurality of storage sprinkler heads projecting from, and fluidly connected with, the plurality of branchlines. The storage sprinkler heads have a k-factor of at least 11.2 and a sprinkler rating greater than 175 psi.

In one configuration of the storage occupancy sprinkler system, the branchlines have an inside diameter between approximately 1.61 inches and approximately 3.32 inches.

In any one of the previous configurations of the storage occupancy sprinkler system, the fluid supply system may include a main pump and a jockey pump.

In any one of the previous configurations of the storage occupancy sprinkler system, the fluid supply system provides a supply pressure, the supply pressure being greater than 175 psi.

In any one of the previous configurations of the storage occupancy sprinkler system, each storage sprinkler head of the plurality of storage sprinkler heads has an RTI of less than 50.

In any one of the previous configurations of the storage occupancy sprinkler system, the storage sprinkler heads may have a sprinkler rating of at least 200 psi.

In any one of the previous configurations of the storage occupancy sprinkler system, the storage sprinkler heads may have a sprinkler rating of at least 250 psi.

In any one of the previous configurations of the storage occupancy sprinkler system, the storage sprinkler heads may have a sprinkler rating of up to 300 psi.

In any one of the previous configurations of the storage occupancy sprinkler system, the at least one cross-main pipe may include a near cross-main pipe and a far cross-main pipe, and the branchlines may extend between the near cross-main pipe and the far cross-main pipe.

In any one of the previous configurations of the storage occupancy sprinkler system, the storage occupancy sprinkler system may be a ceiling-only system.

One aspect of the present disclosure is directed to a sprinkler system for providing fire suppression to a storage occupancy, the storage occupancy including a floor and a ceiling located at a height greater than 35 feet above the floor. The sprinkler system includes a fluid supply system capable of providing a static pressure of greater than 175 psi, a control valve fluidly connected with the fluid supply system, a check valve located downstream of the control valve and fluidly connected thereto, and a plurality of storage sprinkler heads. The storage sprinkler heads each have a body with an orifice therethrough, the orifice being sealed by a sealing assembly configured to withstand a hydrostatic strength test pressure of greater than 700 psi and which has a rated pressure greater than 175 psi, a nominal k-factor rating of at least k16.8, and a thermal trigger having an RTI of less than 50. A network of pipes extend between and fluidly connect the check valve and the plurality of storage sprinklers heads.

In one configuration of the sprinkler system, the fluid supply system may include a fluid source and at least one pump.

In any one of the previous configurations of the sprinkler system, the fluid supply system may include a main pump and a jockey pump.

In any one of the previous configurations of the sprinkler system, the plurality of storage sprinkler head may be located proximate to the ceiling. In one such configuration, each storage sprinkler head of the plurality of storage sprinkler heads may include a fluid deflector located at a distance of between approximately 4 inches and approximately 30 inches from the ceiling.

In any one of the previous configurations of the sprinkler system, at least one storage rack may be included in the storage occupancy, the at least one storage rack having at least one commodity stored thereupon at a storage height of greater than twelve feet above the floor. In one such configuration, at a least a portion of the plurality of storage sprinkler heads may be disposed within the at least one rack.

In any one of the previous configurations of the sprinkler system, the plurality of storage sprinkler heads may be chosen from a group consisting of pendent sprinklers and upright sprinklers.

In any one of the previous configurations of the sprinkler system, each storage sprinkler head of the plurality of storage sprinkler heads is an ESFR sprinkler.

One aspect of the present disclosure is directed to a method of determining a branchline size for a storage occupancy sprinkler system having a fluid supply system, at least one cross-main pipe fluidly connected with the fluid supply system, a plurality of branchlines extending from, and fluidly connected with, the at least one cross-main pipe, and a plurality of storage sprinkler heads projecting from, and fluidly connected with, the plurality of branchlines. The method comprising the steps of: (I) selecting a type of storage sprinkler head having a k-factor of at least 11.2 and a sprinkler rating greater than 175 psi, to employ for the plurality of storage sprinkler heads; (II) determining a design area for the storage occupancy sprinkler system; (III) selecting a branchline size for the storage occupancy sprinkler system; (IV) calculating a system demand for the storage occupancy sprinkler system according to the selected storage sprinkler head within the determined design area and according to the selected branchline size; (V) selecting a main pump capable of supplying a combination of the calculated system demand and an additional safety factor; (VI) calculating a pump rated pressure of the selected main pump; (VII) calculating a static output pressure of the selected main pump based on the pump rated pressure; and (VIII) calculating a supply pressure based on the static output pressure of the selected main pump. Steps (I)-(VIII) are not limited to any particular order and may be performed in any suitable order. At step (IX), if the calculated supply pressure is less than 175 psi, the method further includes repeating steps (I)-(VIII), wherein the selected branchline size is a first branchline size and step (III) includes selecting a second branchline size smaller than the first branchline size. If, however, the calculated supply pressure is greater than the sprinkler rating of the selected storage sprinkler, the method further includes repeating steps (I)-(VIII), wherein the selected branchline size is a first branchline size and step (III) includes selecting a second branchline size greater than the first branchline size. Step (X) includes repeating step (IX) until a branchline size is selected that results in a closest supply pressure to the sprinkler rating of the selected storage sprinkler without exceeding the sprinkler rating of the selected storage sprinkler.

BRIEF DESCRIPTION OF THE SEVERAL VIEWS OF THE DRAWINGS

The following description of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Figure 1:
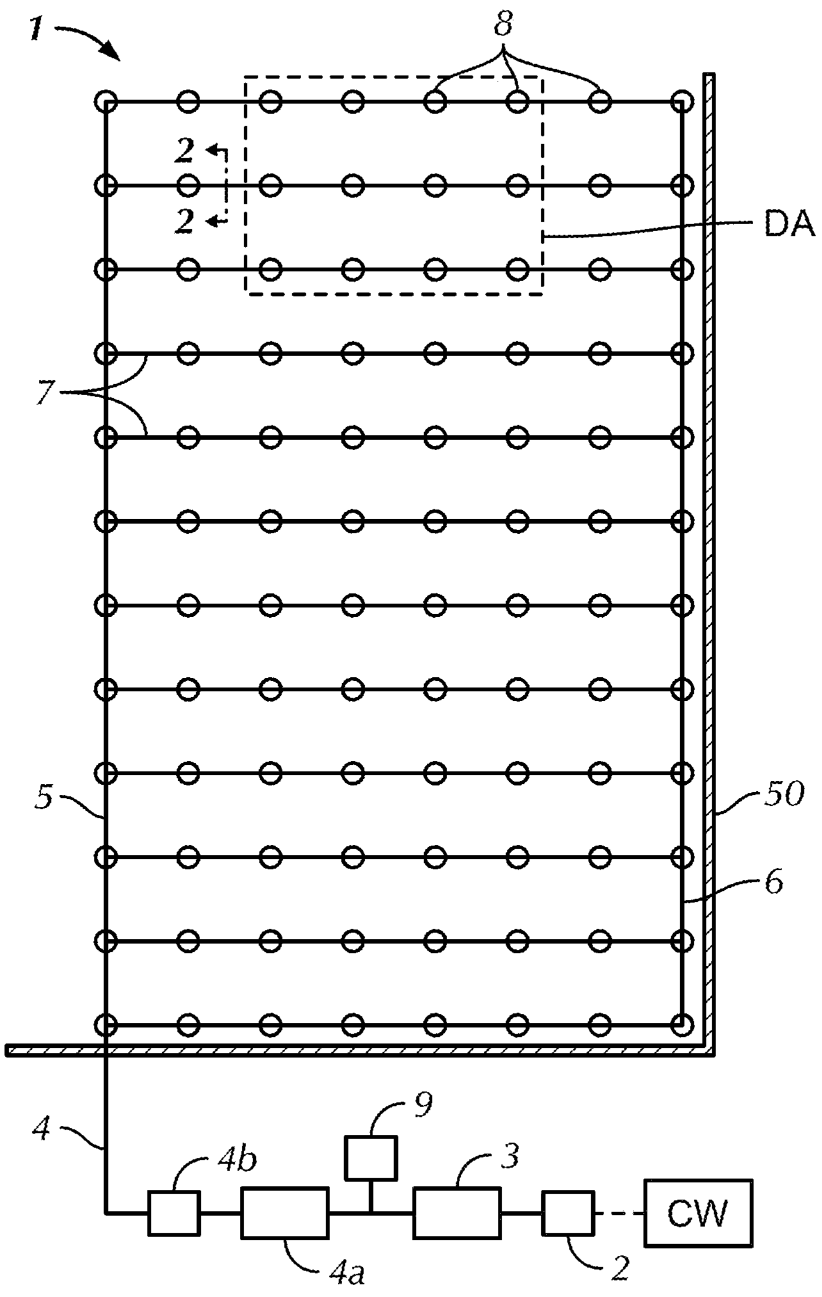
FIG. 1 is a schematic view of a conventional storage occupancy sprinkler system.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the sprinkler system, and designated parts thereof, in accordance with the present disclosure. In describing the sprinkler system, the term proximal is used in relation to the upper end of the device and the term distal is used in relation to the bottom end of the device. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
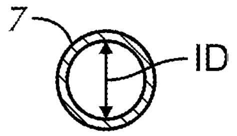
FIG. 2 is a cross-sectional, schematic view of the conventional storage occupancy sprinkler system of FIG. 1, taken along sectional line 2-2.
Figure 3:
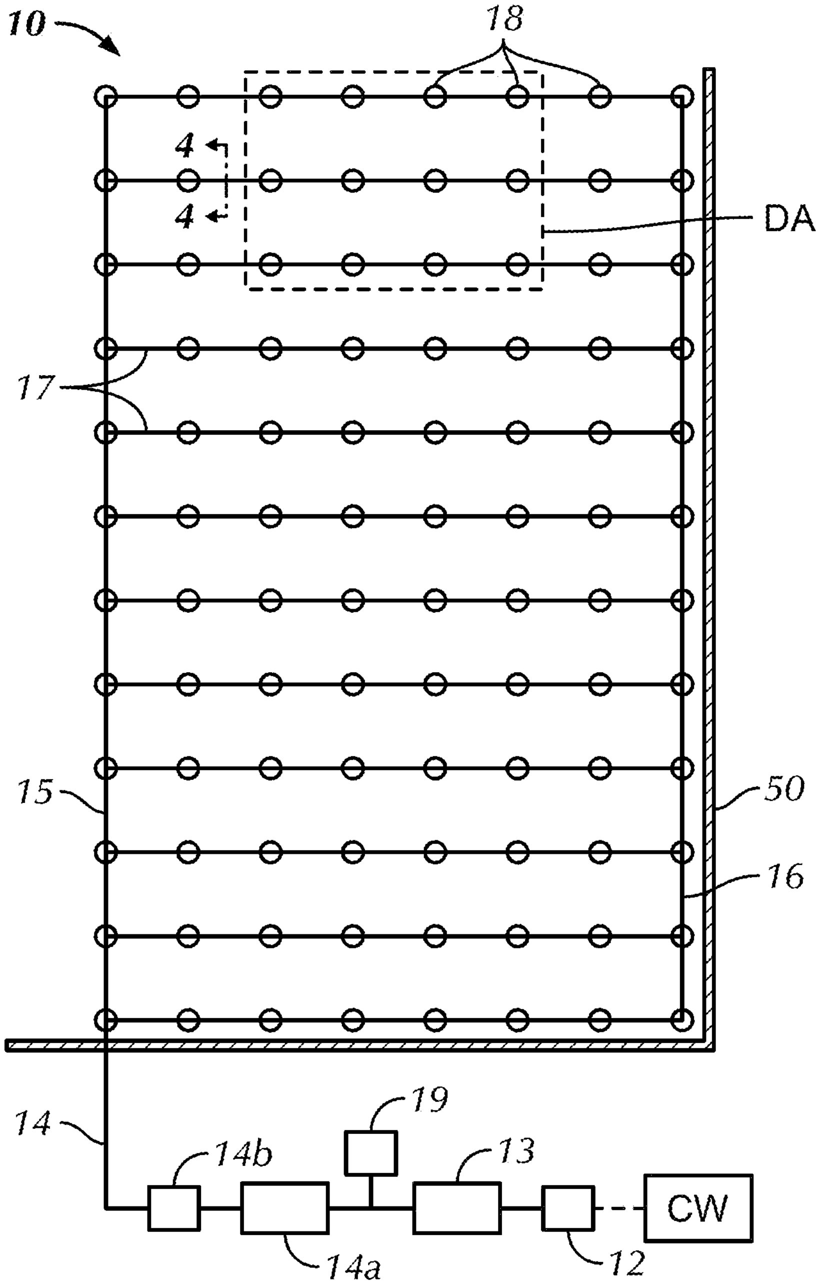
FIG. 3 is a schematic view of a storage occupancy sprinkler system of the present disclosure.
Figure 4:
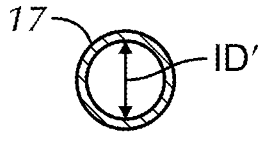
FIG. 4 is a cross-sectional, schematic view of the storage occupancy sprinkler system of FIG. 3, taken along sectional line 4-4.
Figure 5:
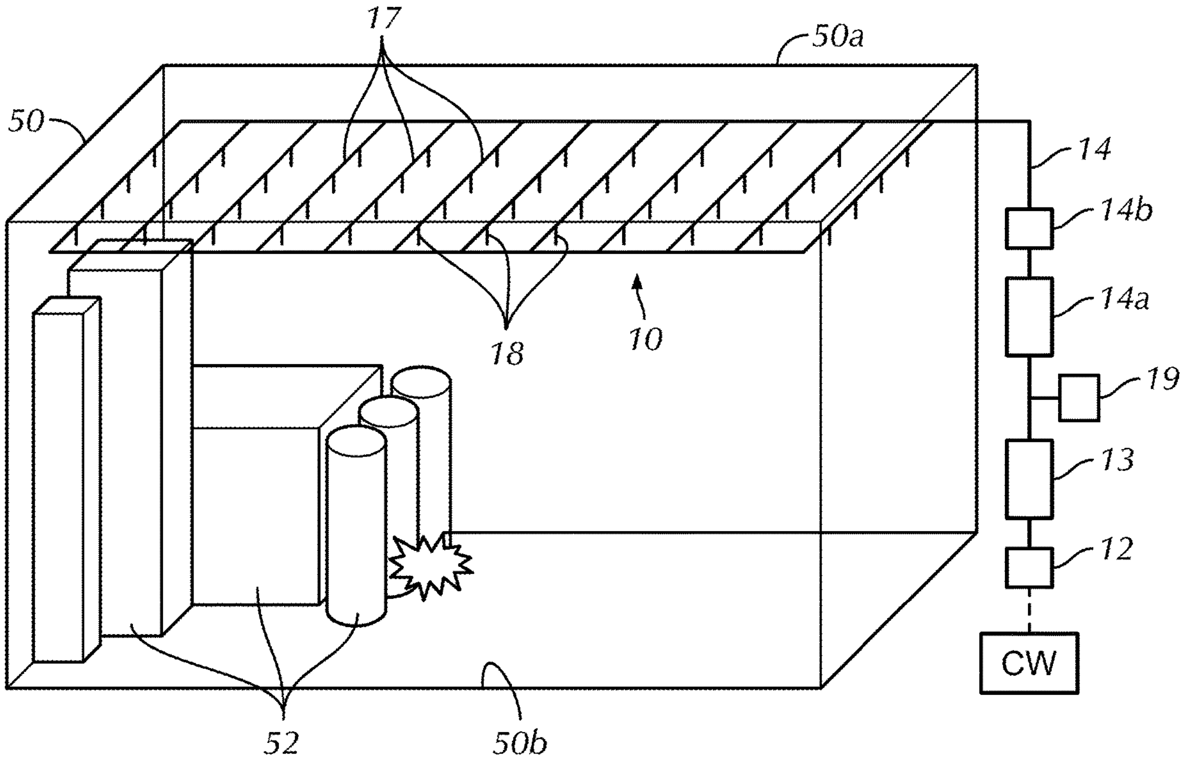
FIG. 5 is a perspective view of a storage occupancy employing the storage occupancy sprinkler system of FIG. 3.
Figure 8:
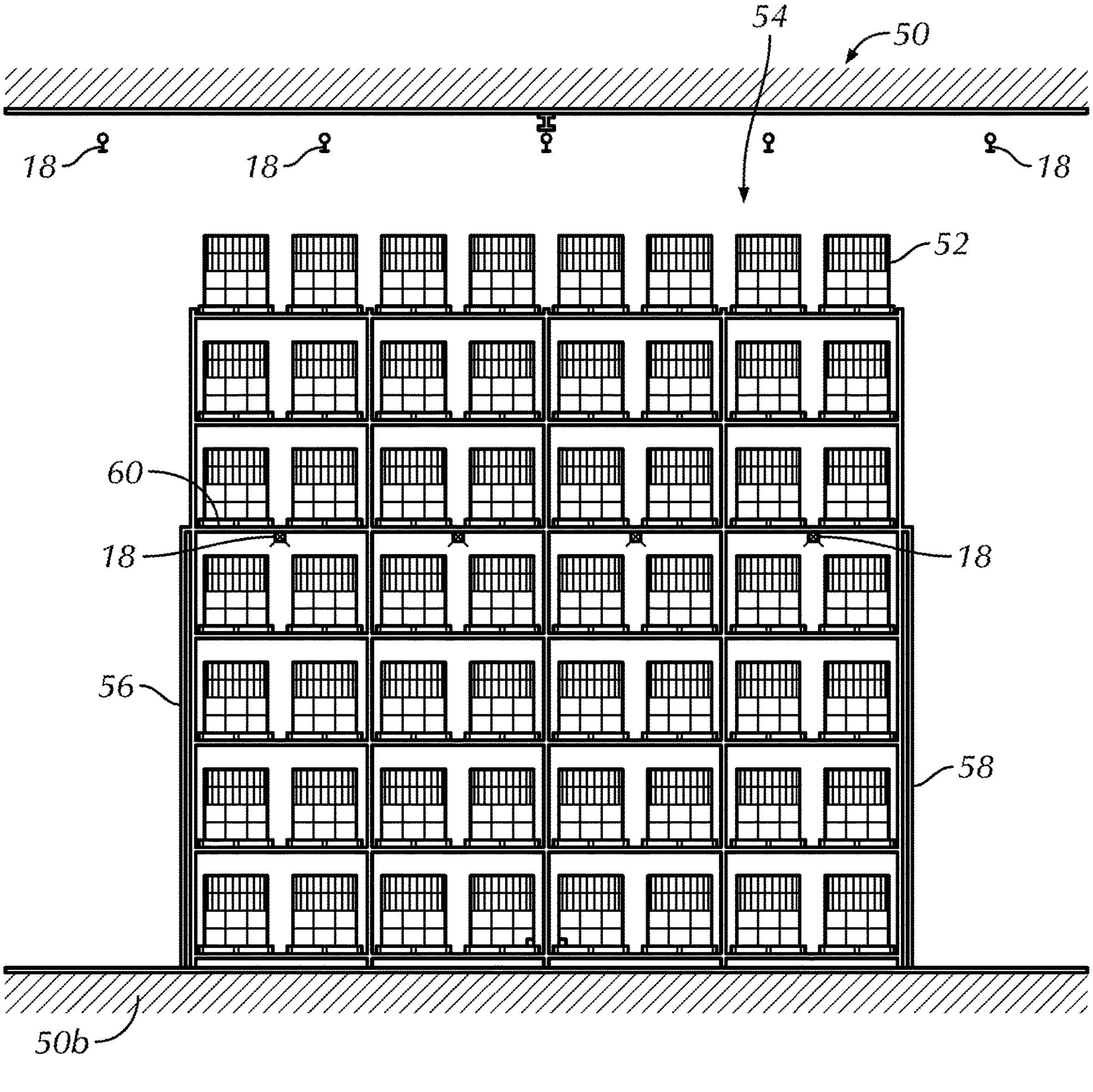
FIG. 8 is an elevational view of a storage occupancy having storage racks and employing ceiling and in-rack storage sprinkler heads.

Referring to the drawings in detail, wherein like numerals indicate like elements throughout, there is shown in FIGS. 1 and 2 a schematic, conventional storage occupancy sprinkler system 1. A storage occupancy 50 (see FIG. 5) stores stored commodities 52 therein. As shown in FIG. 5, the stored commodities 52 may be located, and piled upon, the floor 50*b*. As shown in FIG. 8, the stored commodity/commodities 52 may additionally or alternatively be located on storage racks 54 disposed within the storage occupancy 50. The racks 54 may be configured in single-row, double row or multi-row racks 54. When the stored commodity 52 is disposed in such rack storage, the storage sprinklers may also be disposed within the racks 54, i.e., an in-rack sprinkler system, in addition to those located adjacent the storage occupancy ceiling 50*a*.

As should be understood by those of ordinary skill in the art, a stored commodity 52 includes any of the commodity classifications identified in FM 8-9 and NFPA 13 guidelines, such as: Class 1, Class 2, Class 3, Class 4, cartoned unexpanded plastic, cartoned expanded plastic, uncartoned unexpanded plastic, uncartoned expanded plastic, rubber tires, roll paper, idle pallets, and high bay records. Under NFPA 13 guidelines, plastic commodities are classified under Group A, Group B-Class IV, or Group C-Class III plastics with Group A plastics being the most combustible or highest hazard. The Group A plastics are separately classifiable as cartoned (unexpanded or expanded) and uncartoned (unexpanded or expanded). According to NFPA 30 guidelines, stored commodities 52 may also include flammable and combustible liquids.

For simplification, the sprinkler system 1 has a fluid supply system comprising a reservoir tank and a pump system. As should be understood by those of ordinary skill in the art, in such a system the reservoir tank represents the fluid supply, and a main pump provides the supply pressure and flow rate necessary to achieve at least the sprinkler system demand. Additionally or alternatively, the fluid supply system may also comprise a city/municipal supply system, where the city/municipal system forms at least a portion of the fluid supply and the main pump supplements the city pressure to provide the combined supply pressure and flow rate necessary to achieve the sprinkler system demand. In either form of fluid supply system, a jockey pump may be employed to compensate for small pressure variations as described in further detail below.

Generally, an example ceiling-only conventional storage occupancy sprinkler system 1 includes a reservoir tank 2 (which may supplement a city water supply CW) connected to the main pump 3, which is connected to a main riser pipe 4. The main riser pipe 4 extends generally vertically upwardly (through a control valve 4*a* and optionally also through a check valve 4*b*) to an elevation proximate the occupancy ceiling 50*a*. In a non-limiting grid system, the main riser pipe 4 is connected proximate the upper end thereof to laterally extending cross-main conduits, e.g., a near/primary cross-main pipe 5 and/or a far/secondary cross-main pipe 6 extending generally parallel to the underlying ground surface. Branchlines 7 laterally extend from and/or between the cross-main conduits 5, 6 (also generally parallel to the underlying ground surface) with conventional, ceiling-level storage sprinkler heads 8 projecting from the branchlines 7. An in-rack storage sprinkler system typically includes a fluid supply, e.g. via a conduit(s) extending from the reservoir tank 2 and/or the city water supply CW, fluidly connected to a generally vertically extending riser conduit(s) 56 proximate individual arrays 58 of multi-level storage racks 54. At least one branchline 60 is fluidly connected to, and generally horizontally extends from, a riser conduit 56 and through a level(s) of the multi-level storage racks 54, and into fluid communication with the storage sprinklers disposed within the racks 54. As should be understood, the storage sprinklers disposed within the racks may be the same or different from the ceiling-level storage sprinklers.

In the example, ceiling-only conventional storage occupancy sprinkler system, the sprinkler heads 8 are generally located proximate the ceiling level at an elevational distance between approximately four (4) inches and approximately thirty (30) inches below the ceiling 50*a*, such as, for example, between approximately four (4) inches and eighteen (18) inches below the ceiling 50*a*. As should be understood by those of ordinary skill in in the art, the conventional storage sprinkler heads 8 have a k-factor of at least 11.2 and a sprinkler rating of 175 psi.

A jockey pump 9 is also connected with the sprinkler system 1, e.g., with the main riser pipe 4. As should be understood by those of ordinary skill in the art, the jockey pump 9 is a small capacity pump installed to maintain system pressure in the piping network that might otherwise decay over time and briefly trigger the main pump 3. Jockey pumps commonly maintain the pressure in the system above the pressure of the main pump 3 under static conditions. That is, a jockey pump 9 is selected to be capable of outputting the main pump 3 static pressure and some additional static pressure. A jockey pump 9, however, cannot support the flow required by even a single activated sprinkler. Accordingly, if a sprinkler head 8 is activated, there will still be a pressure drop that is sensed by the main pump 3 and cause the main pump 3 to activate. Therefore, in a reservoir tank and pump system, the system supply pressure is the total of the main pump 3 static pressure (as will be described in further detail below), i.e., pump churn, and the additional jockey pump 9 static pressure. In a city/municipal supply system, the system supply pressure is the total of the city pressure, the main pump 3 static pressure and the additional jockey pump 9 static pressure. For simplicity and consistency throughout the disclosure, it will be assumed that the additional jockey pump static pressure adds 10 psi of pressure to the sprinkler system, but the jockey pump can add different amounts of pressure.

One non-limiting example of a 200 ft×200 ft conventional storage occupancy sprinkler system 1 is provided to generally explain how current storage occupancy sprinkler systems are designed. In this example, there are twenty branchlines 7, with successive branchlines 7 spaced approximately ten feet apart, and the storage sprinkler heads 8 are ESFR sprinkler heads having a k-factor of 14. The sprinkler design pressure is approximately 56 psi, thereby providing a flow of approximately 105 gpm therethrough (calculated in a manner well understood by those of ordinary skill in the art). As should be understood by those of ordinary skill in the art, a common design area DA for system demand calculation of ESFR sprinkler heads 8 may be formed of the four hydraulically most remote sprinkler heads 8 along each of the three hydraulically most remote branchlines 7 in the system, i.e., a 3×4 grid of twelve ESFR sprinkler heads 8. However, other accepted rectangular or non-rectangular design areas for system demand calculation of storage sprinkler heads 8 may be equally selected, including, for example, without limitation, systems where the three hydraulically most remote sprinkler heads 8 along each of the three hydraulically most remote branchlines 7 in the system, i.e., a 3×3 grid of nine sprinkler heads 8, form the design area.

As should be understood, the system demand calculation factors in the pressure required at the individual sprinkler heads 8 within the design area DA in addition to the pressure losses within the system between the reservoir tank 2 supply and the sprinkler heads 8. Pressure losses within the system result primarily from pipe friction, turbulence at fittings and valves, and elevation changes. As also should be understood by those of ordinary skill in the art, NFPA 13 approves of the Hazen-Williams formula, i.e., P=((4.52*Q1.85)/(C1.85*D4.87))*L, to calculate and total pressure losses in the system piping between nodes, where: P=frictional resistance (psi/ft of pipe), Q=flow through the pipe (gpm or metric equivalent), C=frictional loss coefficient based on pipe material, D=actual inside diameter of pipe (inches) and L=the length of the pipe between nodes. As should be understood by those of ordinary skill in the art, nodes are represented by changes in at least one of flow rate, pipe size or piping material. With respect to pressure losses due to elevation changes, the accepted pressure loss due to gravity for water is 0.433 psi for every foot of vertical elevation. Pressure loss calculations at fittings and valves are generally calculated, according to NFPA 13 and as understood by those of ordinary skill in the art, by determining the equivalent length of pipe that would give the same friction loss as the type of elbow joint or valve based on NFPA 13 (2019 ed.), Table 27.2.3.1.1 (Equivalent Schedule 40 Steel Pipe Length Chart along with the Equivalent Length Modifier Section 27.2.3.1.3 to accommodate Schedule 10 piping). Equivalent lengths of various fittings, valves, and other piping components are commonly provided by their manufacturers for this purpose.

As should be appreciated by those of skill in the art, piping used in sprinkler systems is referenced by nominal designation systems that are related to the outer diameter of the pipe in question by various national, international, and jurisdictional standards, most commonly the NPS, DN, and JIS standards promulgated by the ANSI/ASME, the European Committee for Standardization ("CN"), and the Japanese Industrial Standards Committee, respectively. Less common piping standards, such as EN 1127 as promulgated by CN, may refer to piping by its actual outside diameter. Pipe manufacturers may also offer proprietary piping sizes. The inside diameter of the pipes, including as used in the Hazen-Williams formula and similar calculations, is a function of the nominal pipe size as well as the wall thickness, which is denoted as the pipe schedule in the NPS standard (and other terms known to those of skill in the art for the other systems). Further, all dimensions specified in these systems are nominal (or target) dimensions with a certain variation or tolerance in dimension and ovality permitted to accommodate manufacturing variability. While some overlap and equivalency of these various standards exist, the disclosure is not limited to use with any particular piping standard, designation, or schedule, and the references to pipe inside diameter used herein is the nominal inside diameter of piping under any of these descriptors, including the metric conversions thereof.

In the present non-limiting example, the piping in the system is NPS Schedule 40 carbon steel pipe, the branchlines 7 are approximately 200 ft. long, the cross-main pipes 5, 6 are approximately 200 ft. long and the main riser 4 is approximately 40 ft. high. Additionally, the near cross-main pipe 5 has an inside diameter of approximately 6.065 inches and the far cross-main pipe 6 has an inside diameter of approximately 4.026 inches, which are prevalent cross-main dimensions and correspond to NPS 6 and NPS 4 pipe, respectively. The system demand for the present example of a conventional storage occupancy sprinkler system 1 has been calculated (see Appendix A) utilizing the Hydraulic Analyzer of Sprinkler Systems ("HASS") program sold by HRS Systems, Inc., which is an industry accepted tool for hydraulic analysis utilized by those of ordinary skill in the art.

In the present example, and as shown in the calculations in Appendix A, the smallest standardized NPS pipe which can be utilized for the branchlines 7, while not exposing the sprinkler heads 8 in the system to a pressure exceeding 175 psi, is NPS 2.5, having an inside diameter ID (see FIG. 2) of approximately 2.469 inches. As previously described, storage occupancy sprinkler system designers are predominantly limited to selecting piping from the standardized sizes offered. In the present example, NPS 2.5 pipe is the smallest standard sized pipe which may be utilized for the branchlines 7 without exposing the sprinkler heads 8 in the system to a pressure exceeding 175 psi.

That is, the calculated system demand is approximately 108 psi at approximately 1264 gpm when NPS 2.5 pipes are utilized for the branchlines 7. This pressure, however, is flowing pressure, and, as should be understood, the supply pressure when the system is closed, i.e., static pressure at zero flow, must be greater than the system demand. Therefore, it is the static supply pressure that must remain less than the sprinkler rating. The supply pressure depends upon the main pump 3 selected. The AHJ, e.g., the local fire department, generally requires that the main pump 3 be capable of supplying the system demand as well as an added safety margin on top of the system demand, i.e., a safety factor, to ensure that the system demand is met. Generally, a 10 psi or 10% safety margin is acceptable. As should be understood by those of ordinary skill in the art, in a city/municipal supply system, a main pump 3 must be selected that is capable of supplementing the city flow and pressure to meet the system demand and safety factor total.

Generally, fire pumps are selected based on their rated flow and pressure capacity. Listed fire pumps, i.e., pumps that are tested and approved to meet testing agency requirements, are offered in standard flow rate capacities, e.g., 250 gpm, 500 gpm, 750 gpm, 1000 gpm, 1250 gpm, 1500 gpm, 2000 gpm, 2500 gpm, and others. Fire pumps are required to operate up to about 150% of their rated flow. Therefore, it is not required to select a fire pump rated at the system flow demand as this would result in an oversized, and, therefore, unnecessarily more expensive pump. The system demand flow rate should generally fall between approximately 90% and approximately 140% of the selected pump rated capacity, such as, for example, between approximately 115% and approximately 135% of the selected pump rated capacity. For example, in the present example having a system flow demand of approximately 1264 gpm, a main pump 3 having a pump rated capacity of 1000 gpm would be acceptable, as the system demand flow rate would be about 126.5% of the selected pump rated capacity.

Subsequently, pump performance curves for pumps of the selected flow capacity at differing rated pressures, i.e., the pressure output of the pump at the pump rated flow capacity, are analyzed to assess whether a respective pump meets the combined system demand pressure and safety factor at the system demand flow rate. Thus, the pump pressure rating should be greater than the combined system demand pressure and safety factor. As should be understood by those of ordinary skill in the art, pressure output of a pump descends with increasing flow rate. Selecting a main pump 3 having a pressure rating within 5 psi greater than the combined system demand pressure and safety factor is very efficient. Accordingly, for simplicity and consistency between the examples herein, a pressure decay of 5 psi between the pump rated pressure and the combined system demand pressure and safety factor is assumed. That is, for the present example, the pump rated pressure is estimated to be approximately 123 psi, i.e., the total of 108 psi system demand pressure, 10 psi safety factor and 5 psi pressure decay between the pump rated pressure and the combined system demand pressure and safety factor.

Once the pump rated pressure is calculated, the pump churn, i.e., the static pressure output of the pump operating at zero flow, may be calculated. Listed fire pumps must have a pump churn within 140% of the pump rated pressure. Frequently, fire pumps have a pump churn within 115% of the pump rated pressure, and, for consistency throughout the disclosure, the pump churn will be calculated at 115% of the estimated pump rated pressure. Therefore, in the present example, the pump churn of the main pump 3 is approximately 141.5 psi. Thus, the supply pressure, i.e., the total of the main pump 3 pump churn and the additional jockey pump 9 static pressure, for the present example of a conventional storage occupancy sprinkler system 1, is approximately 151.5 psi. Accordingly, this exemplary system is suitable as a conventional storage occupancy sprinkler system 1 because the selected main pump 3 is able to meet the calculated system demand of 108 psi without any exposing the conventional storage sprinkler heads 8 of the system to a pressure exceeding the 175-psi rating thereof.

Turning to FIGS. 3-7, a gridded, ceiling-only storage occupancy sprinkler system, generally designated 10, in accordance with an embodiment of the present disclosure is schematically shown. As should be understood by those of ordinary skill in the art, however, the present disclosure is also equally applicable to a tree or loop system in storage occupancy with storage sprinkler heads 18 mounted proximate the ceiling 50*a* only or additionally mounted within storage racks 54 (FIG. 8). Similarly to the conventional sprinkler system 1, the sprinkler system 10 also takes the form of a reservoir tank and pump system (although the disclosure is equally applicable to a city/municipal supply system) configured for a storage occupancy 50 housing storage commodities 52, i.e., at least one commodity of one of Class 1, Class 2, Class 3, Class 4/cartoned unexpanded plastic, cartoned expanded plastic, uncartoned unexpanded plastic, uncartoned expanded plastic, rubber tires, roll paper, idle pallets, high bay records, Group A cartoned (unexpanded or expanded) and uncartoned (unexpanded or expanded) plastics, Group B-Class IV, Group C-Class III plastics, flammable and combustible liquids, and combinations thereof.

The storage occupancy sprinkler system 10 includes a reservoir tank 12 connected to a main pump 13, which is connected to a main riser pipe 14. As previously indicated, the reservoir tank 12 may supplement a city water supply CW). The main riser pipe 14 extends generally vertically upwardly to an elevation proximate the occupancy ceiling 50*a*. A control valve 14*a* (and optionally a check valve 14*b*) is positioned along the main riser pipe 14 and operable in a manner well understood by those of ordinary skill in the art. The main riser pipe 14 is connected proximate the upper end thereof to laterally extending cross-main conduits, e.g., a near cross-main pipe 15 and a far cross-main pipe 16 extending generally parallel to the underlying ground surface. Branchlines 17 laterally extend between the cross-main conduits 15, 16 (also generally parallel to the underlying ground surface) with storage sprinklers heads 18 projecting from the branchlines 17.

In the sprinkler system 10, the storage sprinkler heads 18 have a k-factor of at least 11.2, e.g., without limitation, between 16.8 and 36.4, with a sprinkler rating of greater than 175 psi, e.g., without limitation, between approximately 200 psi and approximately 300 psi, to provide a designer with greater flexibility to design a more cost-effective storage occupancy sprinkler system. A jockey pump 19 is also connected with the sprinkler system 10, e.g., with the main riser pipe 14.

Figure 6A:
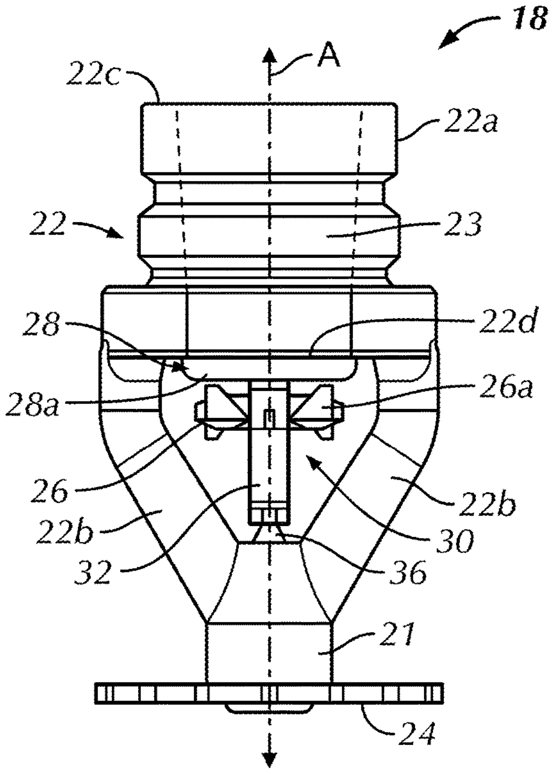
FIG. 6A is a front elevational view of a storage sprinkler head employable in the storage occupancy sprinkler system of FIG. 3, the storage sprinkler head having a fusible link type thermal trigger.
Figure 6B:
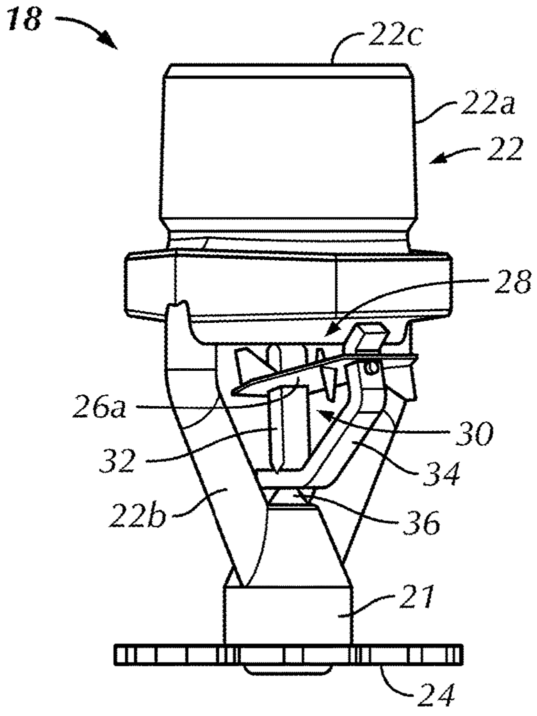
FIG. 6B is a perspective view of the storage sprinkler head of FIG. 6A.
Figure 7:
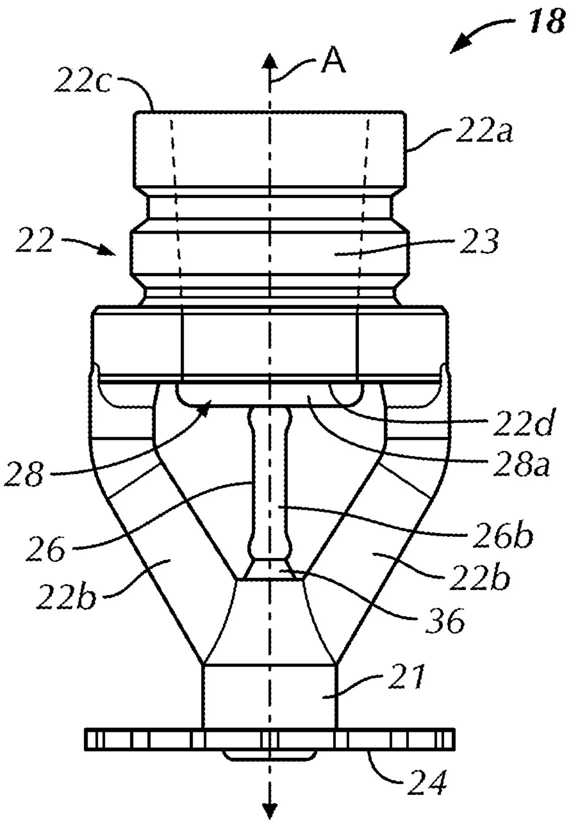
FIG. 7 is a front elevational view of a storage sprinkler head employable in the storage occupancy sprinkler system of FIG. 3, the storage sprinkler head having a glass-bulb type thermal trigger.

As shown in FIGS. 6A-7, the storage sprinkler head 18, by way of a non-limiting example, is a pendent sprinkler, i.e., generally configured for installation in a pendent orientation. Upright storage sprinkler head orientations are equally applicable, however. The sprinkler head 18, includes a sprinkler frame 22 having a proximal frame body 22*a* configured for attachment to the branchline 17, e.g., via threaded engagement, a coupling or the like, and a pair of frame arms 22*b* extending individually and distally from the frame body 22*a* and converging at a distally terminal nosepiece 21. The nosepiece 21 is configured to secure a fluid deflector 24 thereto. As should be understood, the fluid deflector 24 is designed to distribute fire suppression fluid in a manner consistent with listings for accepted storage sprinklers.

The sprinkler frame body 22*a* defines a proximal inlet 22*c*, a distal outlet 22*d*, and an internal fire suppression fluid orifice 23 extending therebetween which defines a sprinkler axis A. The orifice 23 permits the flow of fire suppression fluid therethrough when the sprinkler head 18 is actuated. In an unactuated state, however, a seal assembly 28 is disposed at the distal outlet 22*d* of the orifice 23 to seal the storage sprinkler head 18. The seal assembly comprises a seal plug 28*a* which is axially mounted between the frame body 22*a* and the nosepiece 21. A thermal trigger 26 (i.e., a heat sensitive element) supports the seal plug 28*a*. In the configuration of FIGS. 6A, 6B, the thermal trigger 26 takes the form of a fusible link 26*a* but may alternatively take the form of a glass-bulb type trigger 26*b* (FIG. 7) disposed and axially aligned along the sprinkler axis A, but the disclosure is not so limited. For example, the thermal trigger 26 may take the form of other frangible or non-frangible thermally responsible triggers that are currently known or that later become known.

A load member 36 extending from the nosepiece 21 (as further described below) applies a load through and against the thermal trigger 26 to secure the seal plug 28*a* in sealing engagement with the orifice 23. In the unactuated state, the combination of the sealing assembly 28, the nosepiece 21, and the frame arms 22*b* act to maintain a seal by acting against the pressure of the fluid within the branchline and orifice 23, which is provided by the fluid supply system. As is known in the art, in order to be listed to provide fire suppression for storage occupancies, sprinklers are tested to ensure they can maintain a seal without damage at a test pressure above the sprinkler's rated pressure, e.g., sprinklers rated at 175 psi may be required to withstand a test pressure of 500 psi. The storage sprinkler 18 has a sealing assembly 28, a nosepiece 21, and frame arms 22*b* configured to maintain the seal at a fluid system pressure sufficiently greater than 175 psi, e.g., between approximately 200 psi and approximately 300 psi, and at a hydrostatic strength test pressure greater than 700 psi, such as, for example, at a test pressure of 1200 psi.

The actuation, operation or thermal responsiveness of the storage sprinkler head 18 to a thermal event or sufficient level of heat may be configured to be faster than standard response. For example, the thermal trigger 26 may be configured to have response time index (RTI) of 50 (m*s)^1/2 or less, such as a maximum of 36 (m*s)^1/2, or between approximately 19 (m*s)^1/2 and approximately 36 (m*s)^1/2. As should be understood, the thermal trigger 26 may alternatively be configured to have an RTI of greater than 50 (m*s)^1/2 for other sprinklers heads 18, such, for example, greater than 80 (m*s)^1/2 for standard response sprinkler heads 18. As should be understood by those of skill in the art, the RTI of a given sprinkler head is defined by standardized test methods, such as, for example, the sensitivity-response time index test identified in FM 2000 and FM 2008 and the sensitivity tests-oven heat test identified in UL 199. These tests generally prescribe that the sprinkler be dropped into a network of ducts exhibiting a predetermined air temperature and velocity and the elapsed time to sprinkler activation is measured. The thermal trigger 26 of the storage sprinkler head 18 may be thermally rated within a range of between approximately 155° F. and approximately 286° F., such as, for example, between approximately 164° F. and approximately 225° F., e.g., approximately 212° F. for a quick response storage sprinkler 18 as understood from FM Approvals standards.

Where a storage sprinkler head 18 employs a fusible link 26*a* as the thermal trigger 26, as shown in FIGS. 6A, 6B, the sprinkler head 18 includes a thermal trigger assembly 30 disposed between the frame body 22*a* and the deflector 24 (and between the frame arms 22*b*) to maintain the sealing plug 28*a* positioned in sealing engagement with the outlet 22*d* in an unactuated state of the sprinkler head 18. The thermal trigger assembly 30 includes a strut 32, a lever 34 and the fusible link 26*a* couples the strut 32 and lever 34 together in an actuatable, unactuated state to stabilize the sealing plug 28*a* within the outlet 22*d*. The thermal trigger assembly 30 transfers a proximally directed force of a load member 36, e.g., a threaded screw member acting on the strut 32 and lever 34 arrangement, to the sealing plug 28*a*. The load member 36 is advanced through an open-ended channel (not shown) within the nosepiece 21, e.g., via a threaded engagement, and into engagement with the thermal trigger assembly 30 in a manner well understood by those of ordinary skill in the art.

In the unactuated state, as shown best in FIG. 6B, a proximal end of the strut 32 is engaged with the sealing plug 28*a* and a distal end of the strut 32 is engaged with the lever 34, e.g., at a notch along the lever 34. One end of the lever 34 is fixed between the strut 32 and the load member 36. The other end of the lever 34 is coupled with the strut 32 via the fusible link 26*a*. The load member 36 creates a fulcrum about the notch along the lever 34 balanced against the fusible link 26*a* coupling the other end of the lever 34 with the strut 32. Generally, the fusible link 26*a* includes two plate members joined face to face by a thin layer of fusible material configured to melt at a fixed temperature or range of temperatures, e.g., the previously described thermal rating.

When the storage sprinkler head 18 is actuated, i.e., the fusible link 26*a* is thermally triggered, the fusible material melts and the two plate members separate, disrupting the previous equilibrium between the load member 36 and the fusible link 26*a* about the fulcrum of the lever 34. The lever 34, in turn, pivots about the fulcrum and disengages from the strut 32, resulting in dislodgment of the strut 32 and the lever 34 away from the storage sprinkler head 18. Once the sealing plug 28*a* is no longer constrained by the strut 32, the sealing plug 28*a* is also ejected away from the outlet 22*d* by the upstream pressurized fire suppression fluid in the orifice 23 of the frame body 22*a* (from the branch line 17). The fire suppression fluid sprays out from the fluid orifice 23 in the frame body 22*a* and impacts the deflector 24 for distribution thereof in a spray pattern according to the design of the deflector 24.

Where a storage sprinkler head 18 includes a glass-bulb type thermal trigger 26*b*, as shown in FIG. 7, the load member 36 secures the glass-bulb 26*b* upon the sealing plug 28*a*, in a manner well understood by those of ordinary skill in the art. The glass-bulb 26*b*, via the load member 36, applies pressure to the sealing plug 28*a* (greater than the opposing fire suppression fluid pressure on the sealing plug 28*a* from the upstream fluid in the branch line 17) to prevent the fire suppression fluid (from the branch line 17) from flowing out of the frame body 22*a* until the ambient temperature around the storage sprinkler head 18 reaches the activation temperature or range of temperatures, at which time the glass-bulb 26*b* is triggered/activated, e.g., shattering of the glass bulb 26*b*. The sealing plug 28*a* is subsequently ejected by the upstream pressurized fire suppression fluid and deflected away. The fire suppression fluid sprays out from the fluid orifice 23 in the frame body 22*a* and impacts the deflector 24 for distribution thereof in a spray pattern according to the design of the deflector 24.

Non-limiting examples of the storage occupancy sprinkler system 10 are provided to illustrate the advantages of employing storage sprinkler heads 18 having a sprinkler rating greater than 175 psi. To emphasize the effect of employing storage sprinkler heads 18 rather than storage sprinkler heads 8, the examples of the storage occupancy sprinkler system 10 maintain the majority of the other characteristics of the conventional storage occupancy sprinkler system 1. That is, the storage occupancy sprinkler system 10 also takes the form of a 200 ft×200 ft system 10 of twenty branchlines 17 with successive branchlines 17 spaced approximately ten feet apart, and the storage sprinkler heads 18 are also ESFR sprinkler heads having a k-factor of 14 with a sprinkler design pressure of approximately 56 psi, thereby providing a flow of approximately 105 gpm therethrough. The piping in the system 10 remains NPS Schedule 40 carbon steel pipe, the branchlines 17 remain approximately 200 ft. long, the cross-main pipes 15, 16 remain approximately 200 ft. long and the main riser 14 remains approximately 40 ft. high. Additionally, the near cross-main pipe 15 remains having an inside diameter of approximately 6.025 inches and the far cross-main pipe 16 remains having an inside diameter of approximately 4.026 inches.

In a first, non-limiting example of the storage occupancy sprinkler system 10, the branchlines 17 have an inside diameter ID' (see FIG. 4) of approximately 2.067 inches (corresponding to NPS 2), instead of 2.469 inches as in the example of the sprinkler system 1. As shown in the calculations in Appendix B utilizing the HASS program, this results in a system demand increase from approximately 108 psi at approximately 1264 gpm (of the example of the sprinkler system 1) to approximately 131 psi at approximately 1267 gpm. Thus, a main pump 13 having a pump rated pressure of approximately 146 psi may be selected, i.e., 131 psi system demand pressure+10 psi safety factor+5 psi pressure decay between the pump rated pressure and the combined system demand pressure and safety factor (as previously explained with respect to the example of the sprinkler system 1). Accordingly, the pump churn of the main pump 13 would be approximately 168 psi. Thus, the supply pressure, i.e., the total of the main pump 13 pump churn and the additional jockey pump 19 static pressure for the present example of the storage occupancy sprinkler system 10 is approximately 178 psi.

As should be understood by those of ordinary skill in the art, this non-limiting example of a storage occupancy sprinkler system 10 would not be permissible with conventional storage sprinkler heads 8 having a sprinkler rating of 175 psi, as the sprinkler heads 8 would be exposed to a pressure greater than their pressure rating. Conversely, this example of the storage occupancy sprinkler system 10 is both permissible and advantageous over the sprinkler system 1 when used with storage sprinkler heads 18 having a sprinkler rating of greater than 175 psi. This exemplary advantage is that smaller inside diameter branchlines are less costly than relatively larger inside diameter branchlines.

In the example of the conventional storage occupancy sprinkler system 1, utilizing schedule 40 NPS pipe, the NPS 2.5 branchlines currently cost approximately $11.54 per foot. Thus, twenty branchlines 7, each approximately two-hundred feet long, equates to four thousand feet of branchlines 7, totaling $46,160 just for the branchlines 7. Conversely, in the example of the storage occupancy sprinkler system 10, also utilizing schedule 40 NPS pipe, the NPS 2 branchlines currently cost approximately $7.10 per foot (from the same source). Thus, four thousand feet of branchlines 17 would cost $28,400, resulting in savings of $17,760 or approximately a 38.5% savings over the conventional system 1 for the branchline piping alone. As should be appreciated, additional savings would be realized because the couplings and fittings used to interconnect that piping would also be a less costly smaller size. Further, and in particular in situations where branchline piping may be sized at NPS 2 or less, even more cost may be saved by avoiding the requirement for seismic sway bracing that is imposed on branchlines of NPS 2.5 and greater.

In a second, non-limiting example of a storage occupancy sprinkler system 10, the branchlines 17 have an inside diameter ID' (see FIG. 4) of approximately 1.61 inches (corresponding to NPS 1.5) as compared to approximately 2.067 inches (corresponding to NPS 2) in the prior example of a system 10. As shown in the calculations in Appendix C utilizing the HASS program, this results in a system demand increase to approximately 226 psi at approximately 1280 gpm. Thus, a main pump 13 having a pump rated pressure of approximately 241 psi may be selected, i.e., 226 psi system demand pressure+10 psi safety factor+5 psi pressure decay between the pump rated pressure and the combined system demand pressure and safety factor (as previously explained with respect to the example of the sprinkler system 1). Accordingly, the pump churn of the main pump 13 would be approximately 277 psi. Thus, the supply pressure, i.e., the total of the main pump 13 pump churn and the additional jockey pump 19 static pressure for the present example of the storage occupancy sprinkler system 10 is approximately 287 psi. Currently, schedule 40 NPS 1.5 branchlines cost approximately $5.48 per foot (from the same source). Thus, four thousand feet of branchlines 17 of NPS 1.5 would cost $21,920, resulting in savings of $24,240 or approximately a 52.5% savings over the conventional system 1 when sprinklers 18 having a k-factor of at least 11.2 and a sprinkler rating of greater than 175 psi, in this example a sprinkler rating of at least 287 psi, are employed.

In yet another non-limiting example of a 200 ft×200 ft conventional storage occupancy sprinkler system 1 with twenty branchlines 7 having successive branchlines 7 spaced approximately ten feet apart (FIGS. 1, 2), ESFR storage sprinkler heads 8 having a k-factor of 25.2 are selected, with a sprinkler design pressure of approximately 40 psi, thereby providing a flow of approximately 159.4 gpm therethrough. The piping in the system is NPS Schedule 10 carbon steel pipe, the branchlines 7 are approximately 200 ft. long, the cross-main pipes 5, 6 are approximately 200 ft. long and the main riser 4 is approximately 40 ft. high. Additionally, the near cross-main pipe 5 has an inside diameter of approximately 6.357 inches and the far cross-main pipe 6 has an inside diameter of approximately 4.260 inches, which are common cross-main dimensions and correspond to NPS 6 and NPS 4 pipe, respectively.

In this example, and as shown in the calculations in Appendix D using the HASS program, the smallest standardized NPS pipe which can be utilized for the branchlines 7 while not exposing the sprinkler heads 8 in the system to a pressure exceeding 175 psi is NPS 2.5, having an inside diameter ID of approximately 2.635 inches. That is, the calculated system demand when NPS 2.5 pipes are utilized for the branchlines 7 is approximately 103 psi at approximately 1928 gpm. Thus, the main pump 3 is estimated to have a pump rated pressure of approximately 118 psi, i.e., 103 psi system demand pressure+10 psi safety factor+5 psi pressure between the pump rated pressure and the combined system demand pressure and safety factor (as previously explained with respect to the previous example of the sprinkler system 1). Accordingly, the pump churn of the main pump 3 would be approximately 135.7 psi, resulting in a supply pressure, i.e., the total of the main pump 3 pump churn and the additional jockey pump 9 static pressure, for the present example of a conventional storage occupancy sprinkler system 1, is approximately 145.7 psi. Therefore, this exemplary system is suitable as a conventional storage occupancy sprinkler system 1 because the selected main pump 3 is able to meet the calculated system demand of approximately 103 psi without exposing the conventional storage sprinkler heads 8 of the system to a pressure exceeding the 175-psi rating thereof. The NPS 2.5 branchlines currently cost approximately $5.93 per foot. Thus, twenty branchlines 7, each approximately two-hundred feet long, equates to four thousand feet of branchlines 7, totaling $23,720 just for the branchlines 7.

Conversely, in an equivalent storage occupancy sprinkler system 10 of the present disclosure (FIGS. 3, 4) employing storage sprinkler heads 18 having a sprinkler rating greater than 175 psi also in the form of ESFR sprinkler heads having a k-factor of 25.2, NPS 2 pipe, having an inside diameter ID' of approximately 2.157 inches, may be utilized for the branchlines 17, instead of the NPS 2.5 pipe having an inside diameter ID of 2.635 inches.

Namely, the sprinkler system 10 remains a 200 ft×200 ft system with twenty branchlines 17 having successive branchlines 17 spaced approximately ten feet apart. The ESFR, K25.2 sprinkler heads 18 have a sprinkler design pressure of approximately 56 psi, thereby providing a flow of approximately 105 gpm therethrough. The piping in the present, exemplary system 10 remains NPS Schedule 10 carbon steel pipe, the branchlines 17 remain approximately 200 ft. long, the cross-main pipes 15, 16 remain approximately 200 ft. long and the main riser 14 remains approximately 40 ft. high. Additionally, the near cross-main pipe 15 remains having an inside diameter of approximately 6.375 inches and the far cross-main pipe 16 remains having an inside diameter of approximately 4.260 inches.

As shown in the calculations in Appendix E utilizing the HASS program, this results in a system demand increase from approximately 103 psi at approximately 1928 gpm to approximately 148 psi at approximately 1938 gpm. Thus, a main pump 13 having a pump rated pressure of approximately 163 psi may be selected, i.e., 148 psi system demand pressure+10 psi safety factor+5 psi pressure decay between the pump rated pressure and the combined system demand pressure and safety factor. Accordingly, the pump churn of the main pump 13 would be approximately 170 psi. Thus, the supply pressure, i.e., the total of the main pump 13 pump churn and the additional jockey pump 19 static pressure for the present example of the storage occupancy sprinkler system 10 is approximately 180 psi which is not permissible in the conventional sprinkler system 1 but is permissible in the sprinkler system 10 of the present disclosure. In this exemplary storage occupancy sprinkler system 10, also utilizing schedule 10 NPS pipe, the NPS 2 branchlines currently cost approximately $4.27 per foot (from the same source). Thus, four thousand feet of branchlines 17 would cost $17,080, resulting in savings of $6,640, or approximately a 28% savings, over the previous conventional system 1 described.

As can be seen from the aforementioned non-limiting examples of the sprinkler system 10 of the present disclosure, employing storage sprinkler heads 18 having a k-factor of at least 11.2 and a sprinkler rating of greater than 175 psi enables a designer to utilize smaller branchlines, including smaller standard sized branchlines, without exceeding the sprinkler rating. Smaller branchlines will result in an increased system demand pressure, and, therefore, require a stronger main pump 13. Nevertheless, the increase in cost of the main pump 13 is a negligible, one-time cost (as should be known by those of ordinary skill in the art) compared to the cost savings in utilizing smaller branchlines. As should be appreciated, the aforementioned example branchlines costs may change over time, whereas the general percentage savings from larger to smaller branchlines would remain in effect. Moreover, an occupancy may include multiple sprinkler systems, with the main pump 13 feeding all of the systems. As also should be understood, therefore, the cost savings of the storage occupancy sprinkler system(s) 10 over the conventional storage occupancy sprinkler system 1, relative to the cost increase of the stronger main pump 13, will be even more significantly pronounced when larger and/or multiple systems are employed.

The examples described herein are merely illustrative of certain advantages offered to the design of storage occupancy sprinkler systems by the design flexibility afforded by employing storage sprinkler heads having a k-factor of at least 11.2 and a sprinkler pressure rating of greater than 175 psi. These advantages are anticipated to also be realized in storage occupancy sprinkler systems having layouts other than the exemplar gridded layouts, such as non-gridded layouts (of which tree layouts and loop layouts are common examples), and with other sprinkler k-factors of at least k11.2, of which k14, k17, k20, k22, k25, k28, and k34 are examples. These advantages may also permit smaller riser and/or cross-main piping in addition to smaller branchlines, as well as greater flexibility in selecting other sprinkler system components (such as fittings and valves) due to the use of the features described herein. It is anticipated that these advantages will be realized across common and practical ranges of standardized riser piping sizes and schedules, including, for example from NPS 4 schedule 40 (having an inside diameter of approximately 4.03 inches) to NPS 10 schedule 10 (having an inside diameter of approximately 10.42 inches), and across common and practical ranges of standardized branchline piping sizes and schedules, such as, for example, from NPS 1.25 schedule 40 (having an inside diameter of approximately 1.38 inches) to NPS 4 schedule 7 (having an inside diameter of approximately 4.30 inches), such as, for example, from NPS 1.5 schedule 40 (having an inside diameter of approximately 1.61 inches) to NPS 3 schedule 7 (having an inside diameter of approximately 3.31 inches).

It will, therefore, be appreciated by those skilled in the art that various modifications and alterations could be made to the disclosure above without departing from the broad inventive concepts thereof. Some of these have been discussed above and others will be apparent to those skilled in the art. For instance, while the examples herein were calculated based on wet systems, this disclosure is equally applicability to dry or pre-action systems. It is understood, therefore, that this disclosure is not limited to the particular embodiments disclosed, but it is intended to cover modifications within the spirit and scope of the present invention, as set forth in the appended claims.

We claim:

1. A method of determining a branchline size for a storage occupancy sprinkler system having a fluid supply system, at least one cross-main pipe fluidly connected with the fluid supply system, a plurality of branchlines extending from, and fluidly connected with, the at least one cross-main pipe, and a plurality of storage sprinkler heads projecting from, and fluidly connected with, the plurality of branchlines, the method comprising the steps of:

(I) selecting a type of storage sprinkler head having a k-factor of at least 11.2 and a sprinkler rating greater than 200 psi, to employ for the plurality of storage sprinkler heads;

(II) determining a design area for the storage occupancy sprinkler system;

(III) selecting a branchline size for the storage occupancy sprinkler system;

(IV) calculating a system demand for the storage occupancy sprinkler system according to the selected storage sprinkler head within the determined design area and according to the selected branchline size;

(V) selecting a main pump capable of supplying a combination of the calculated system demand and an additional safety factor;

(VI) calculating a pump rated pressure of the selected main pump;

(VII) calculating a static output pressure of the selected main pump based on the pump rated pressure;

(VIII) calculating a supply pressure based on the static output pressure of the selected main pump; and (IX) if the calculated supply pressure is less than 200 psi, repeating steps (I)-(VIII), wherein the selected branchline size is a first branchline size and step (III) comprises selecting a second branchline size smaller than the first branchline size,

OR if the calculated supply pressure is greater than the sprinkler rating of the selected storage sprinkler, repeating steps (I)-(VIII), wherein the selected branchline size is a first branchline size and step (III) comprises selecting a second branchline size greater than the first branchline size; and (X) repeating step (IX) until a branchline size is selected that results in a closest supply pressure to the sprinkler rating of the selected storage sprinkler without exceeding the sprinkler rating of the selected storage sprinkler.

2. The method of claim 1, wherein the fluid supply system is a water supply system.

3. The method of claim 1, wherein the storage sprinkler heads each comprise a sprinkler frame having a frame body releasably mounted to the corresponding branchline, the sprinkler frame starting at an inlet of the frame body and extending distally therefrom.

4. The method of claim 3, wherein the storage sprinkler heads each further comprise:

a pair of frame arms extending individually and distally from the frame body and converging at a distally terminal nosepiece; and a fluid deflector secured to the nosepiece.

5. The method of claim 4, wherein the frame body further includes an internal orifice extending from the inlet to an outlet of the frame body and the storage sprinkler heads each further comprise a sealing plug disposed at the outlet and a thermally responsive fusible link supporting the sealing plug.

6. The method of claim 1, wherein the step of selecting a type of storage sprinkler head comprises selecting a type of storage sprinkler head having a sprinkler rating of at least 210 psi.

7. The method of claim 1, wherein the step of selecting a type of storage sprinkler head comprises selecting a type of storage sprinkler head having a sprinkler rating of at least 220 psi.

8. The method of claim 1, wherein the step of selecting a type of storage sprinkler head comprises selecting a type of storage sprinkler head having a sprinkler rating of at least 230 psi.

9. The method of claim 1, wherein the step of selecting a type of storage sprinkler head comprises selecting a type of storage sprinkler head having a sprinkler rating of at least 240 psi.

10. The method of claim 1, wherein the step of selecting a type of storage sprinkler head comprises selecting a type of storage sprinkler head having a sprinkler rating of at least 250 psi.

11. The method of claim 1, wherein the step of selecting a type of storage sprinkler head comprises selecting a type of storage sprinkler head having a sprinkler rating of at least 300 psi.

12. The method of claim 1, wherein the step of selecting a type of storage sprinkler head comprises selecting a type of storage sprinkler head having a k-factor of at least 16.8.

13. The method of claim 1, wherein the step of selecting a branchline size comprises selecting a branchline size having an inside diameter between approximately 1.61 inches and approximately 3.32 inches.

14. The method of claim 1, wherein the fluid supply system provides a supply pressure greater than 175 psi.

15. The method of claim 1, wherein the step of selecting a type of storage sprinkler head comprises selecting a type of storage sprinkler head having an RTI of less than 50.

* * * * *